A. E. BAWTREE.
MEANS FOR REGULATING THE FLOW OF COMPRESSED GASES.
APPLICATION FILED MAR. 8, 1918.
1,421,381.
Patented July 4, 1922.
6 SHEETS—SHEET 2.
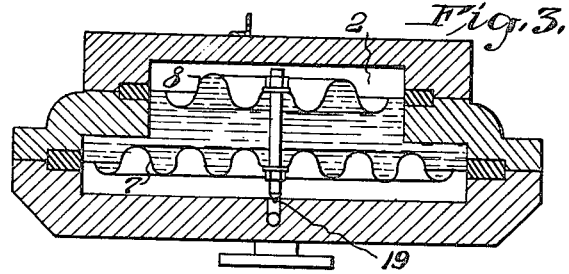
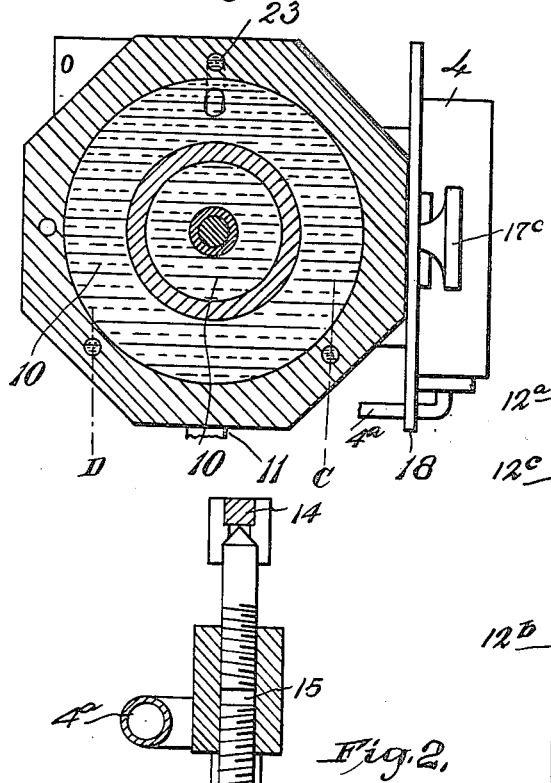
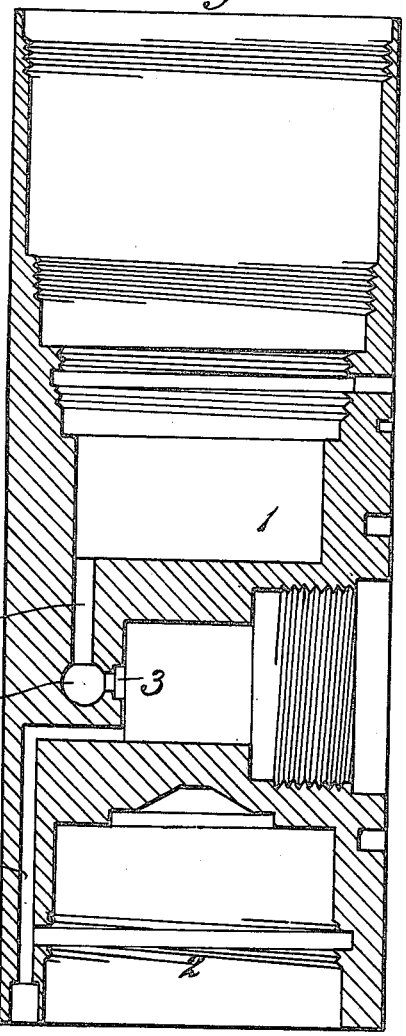
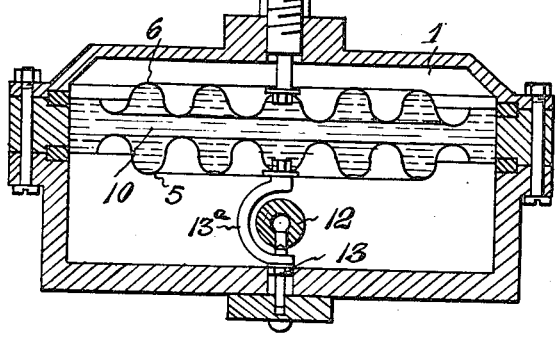
Inventor
Alfred Edwin Bawtree
per
Attorney.

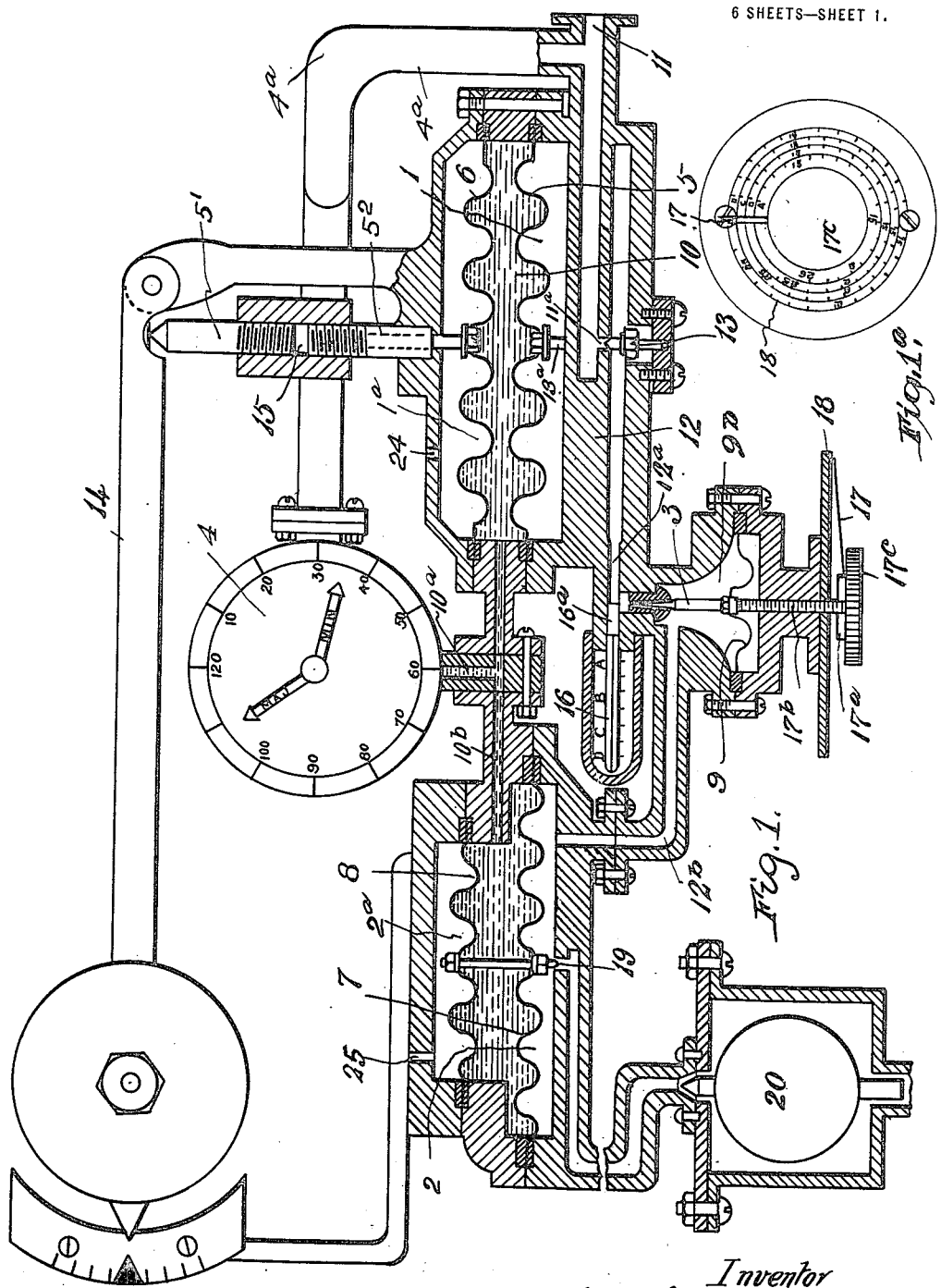

A. E. BAWTREE.
MEANS FOR REGULATING THE FLOW OF COMPRESSED GASES.
APPLICATION FILED MAR. 8, 1918.

1,421,381.

Patented July 4, 1922.
6 SHEETS—SHEET 3.

Inventor
Alfred Edwin Bawtree
per
Attorneys

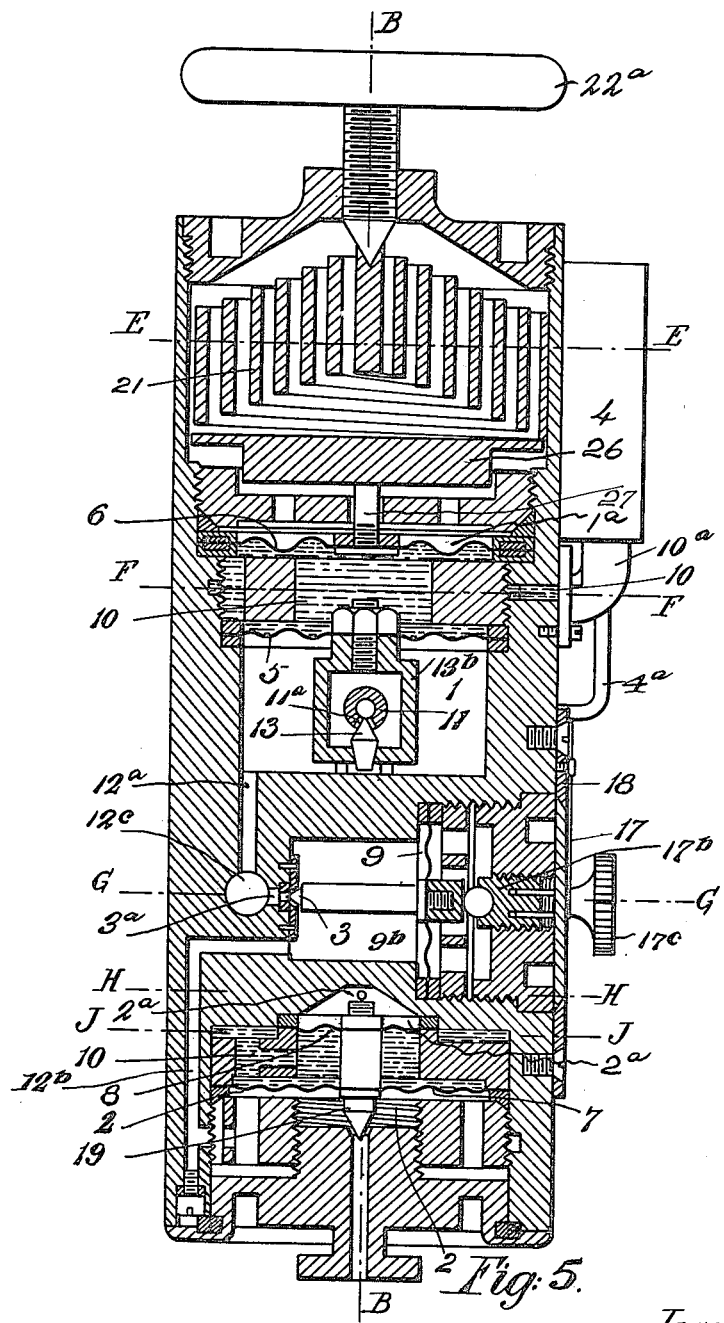

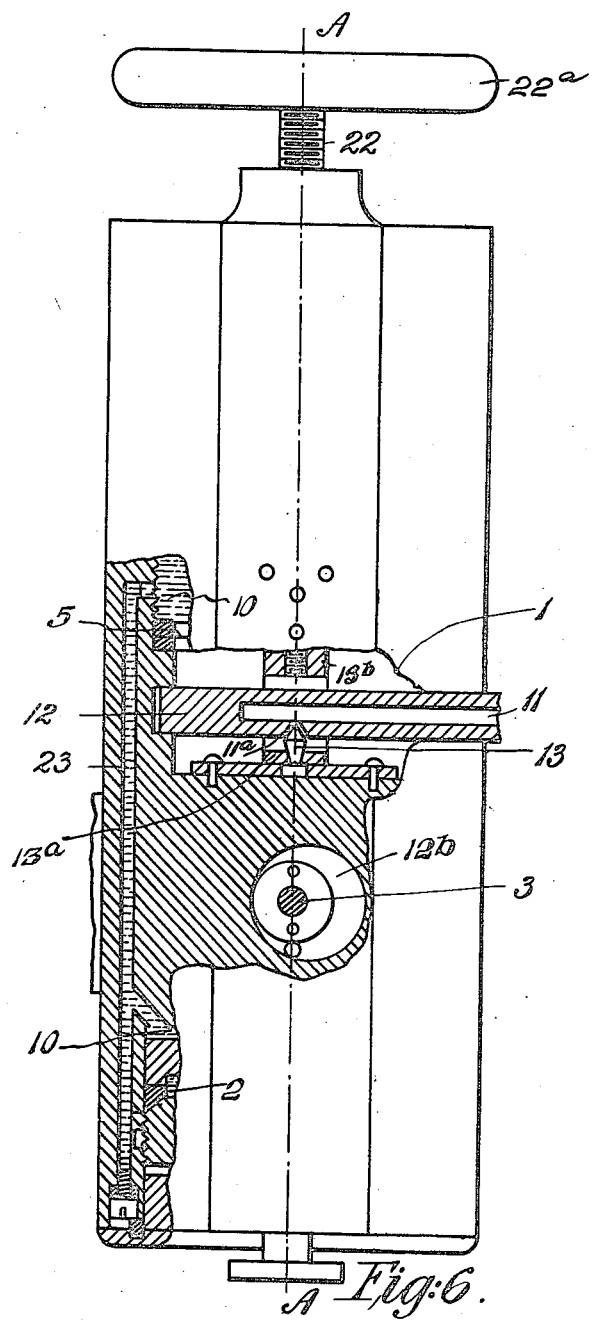

A. E. BAWTREE.
MEANS FOR REGULATING THE FLOW OF COMPRESSED GASES.
APPLICATION FILED MAR. 8, 1918.
1,421,381.
Patented July 4, 1922.
6 SHEETS—SHEET 6.
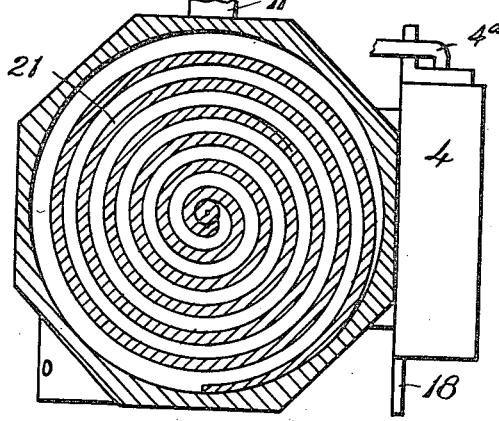
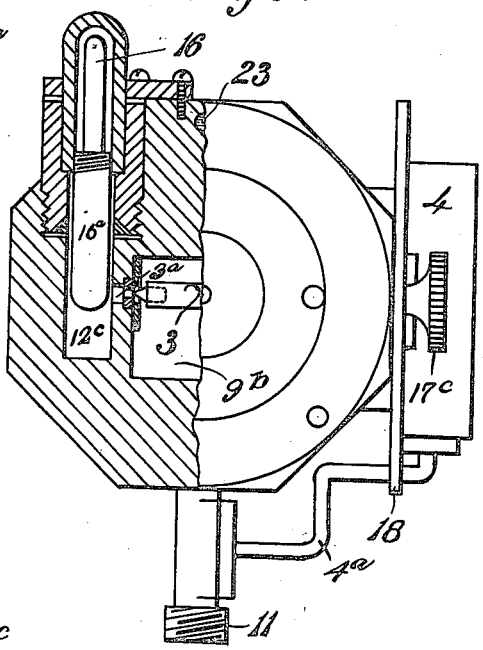
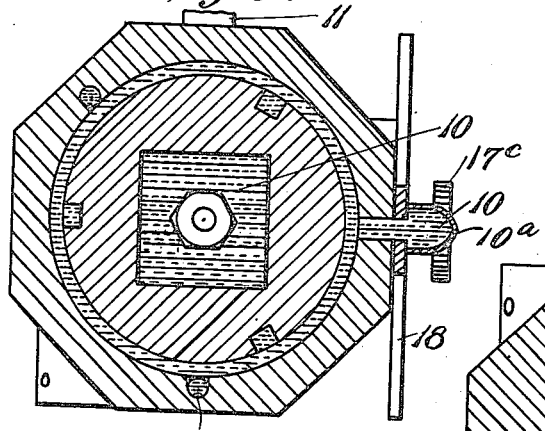
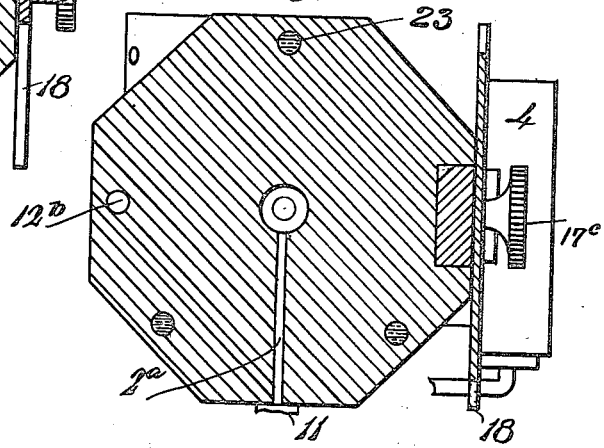
Inventor
Alfred Edwin Bawtree
per
Attorneys

UNITED STATES PATENT OFFICE.

ALFRED EDWIN BAWTREE, OF SUTTON, ENGLAND, ASSIGNOR OF ONE-HALF TO ARTHUR SAMUEL LEGG, OF THORNTON HEATH, ENGLAND.

MEANS FOR REGULATING THE FLOW OF COMPRESSED GASES.

1,421,381.  Specification of Letters Patent.  Patented July 4, 1922.

Application filed March 8, 1918. Serial No. 221,313.

*To all whom it may concern:*

Be it known that I, ALFRED EDWIN BAWTREE, a subject of the King of Great Britain and Ireland, residing at 7 Manor Park Road, Sutton, in the county of Surrey, England, have invented a new and useful Improved Means for Regulating the Flow of Compressed Gases, of which the following is a specification.

My invention relates to means for regulating the flow of compressed gases generally and in particular to controlling the supply of chlorine gas for the purpose of purifying water.

My invention consists of a modification of that kind of valve controlling mechanism in which such control is obtained by means of a non-elastic fluid. The purpose of my system is to operate the various valves, gauges and other portions of the gas controlling device in such a manner as to effect the following objects:

The reduction of the variable pressure of the original gas supply to a constant pressure.

The reduction of the constant pressure thus obtained to a lower constant pressure, which is some definite proportion of the higher constant pressure.

The operation of indicating devices.

In conjunction with the foregoing objects the system of control by means of a non-elastic fluid offers various convenient controls. For example, it will enable the gas regulating device to be thrown into and out of gear by a distant operator possessing a connection with the apparatus by means of a suitable tube. Similarly the starting, stopping or modifying of the action of the gas controlling device may be operated by the water supply (in the case in which the apparatus is employed for chlorinating water,) thereby rendering the system of gas supply automatic. It is evident that this power of external and automatic control, by regulating the pressure of the non-elastic fluid in my special form of mechanism is equally applicable in other cases than that of chlorinating water; for example in an oxy-acetylene blowpipe or furnace, variations in the pressure of one of the gases may be caused to operate upon the non-elastic fluid which regulates the pressure of the other gas, thereby always maintaining the correct relation between the quantities of the two gases. Or again in this same case of the oxy-acetylene furnace, a pyrometer may be connected to a suitable electrical device to operate the non-elastic fluid employed in my special mechanism, thereby ensuring a uniform temperature in the said furnace.

In its simplest form my invention consists of two main chambers which we will call respectively the receiving and delivering chambers. In the receiving chamber the action of the non-elastic fluid is to reduce the variable pressure of the compressed gas to a regular pressure, and the delivering chamber, its action is to reduce the pressure of the gas received from the receiving chamber to a definite proportion of what it was in the receiving chamber. There is in consequence a definite and known difference of pressure in the gas in the two chambers. The quantity of gas passing from the one to the other can consequently be measured by any suitable form of valve or other controllable opening which has once been calibrated for the passage of gas under the difference of pressure which the fluid system provides in the two chambers.

Even in this simplest form of the mechanism various adjustments are of course needed, such as means for compensating for changes of volume of the non-elastic fluid with varying temperatures and, when the mechanism is required to deliver gas by weight rather than by volume, for compensating for the different densities of the gas with varying temperatures.

My invention is illustrated by way of example in the accompanying drawings, in which:

Figure 1 shows a vertical section of a simple form of the above described mechanism:

Figure 1ª shows a side elevation of the calibrated scale and pointer by which the valve between the gas receiving chamber and the gas delivery chamber is controlled.

Figure 2 shows a transverse section on the line K—K of Figure 1;

Figure 3 shows a transverse section on the line L—L of Figure 1;

Figure 5 shows a side sectional elevation upon the center line A of Figure 4;

Figure 6 shows a front elevation in part section taken on the center line B of Figure 5;

Figure 7 shows a sectional plan on the line E of Figure 5, looking down;

Figure 8 shows a sectional plan on the line F of Figure 5, looking down;

Figure 9 shows a part sectional plan on the line G of Figure 5, looking up;

Figure 10 shows a sectional plan on the line H of Figure 5, looking up;

Figure 11 shows a sectional plan on the line J of Figure 5, looking up; and

Figure 12 is a side vertical section on the center line of the body of the mechanism, constructed entirely from one solid block of material.

Figure 4:
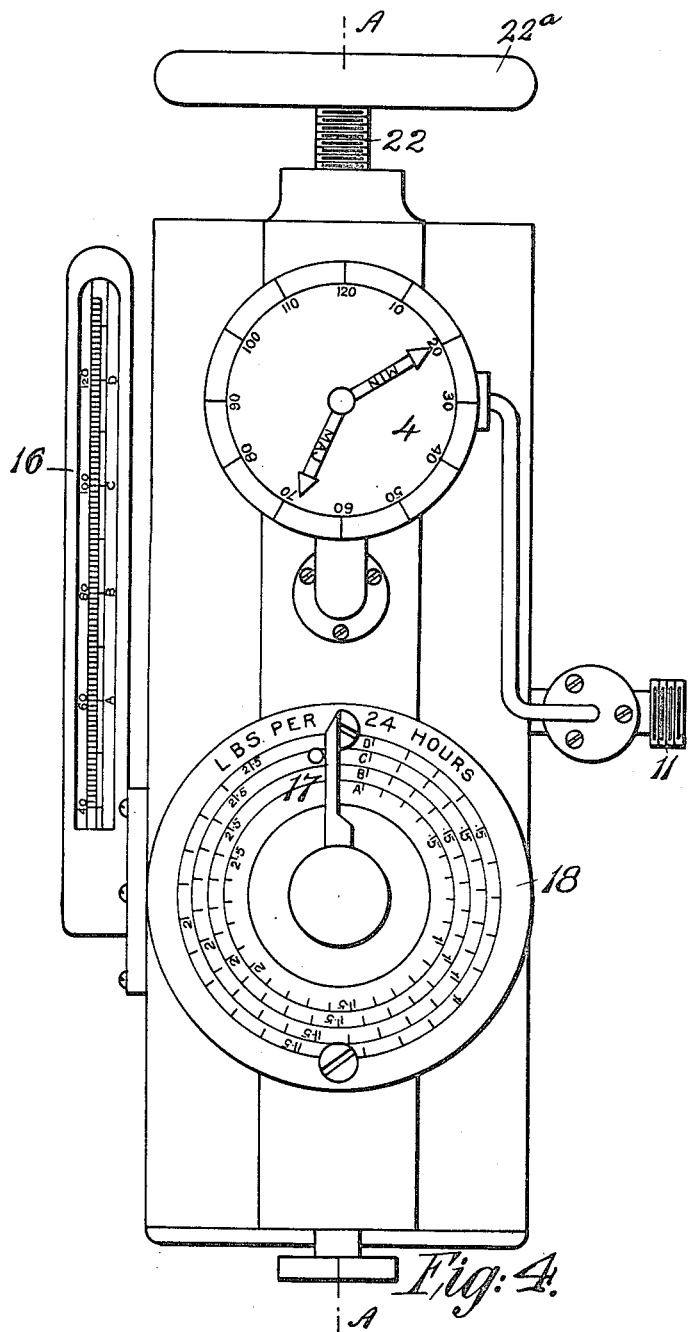
Figure 4 shows a front elevation of an alternative form of the complete mechanism.

Referring to Figure 1 of the drawings, 1 indicates the gas-receiving chamber and 2 indicates the gas delivery chamber. The gas pressure in these chambers is controlled by the pairs of flexible diaphragms 5, 6, and 7, 8, which pairs of diaphragms respectively control the valve opening the inlet to the receiving chamber 1 and the outlet from the delivery chamber 2. A non-elastic fluid 10, such as oil, fills the spaces between the said pairs of flexible diaphragms, these spaces being connected by the passage $10^b$ which communicates with pressure gauge 4 through passages $10^a$. The space $1^a$ above the diaphragm 6 and the space $2^a$ above the diaphragm 8 are respectively open to the atmosphere through the air relief outlets 24 and 25. 3 indicates the valve which controls the flow of gas between the gas-receiving chamber 1 and the gas-delivery chamber 2. 4 indicates a pressure gauge, which shows the pressure of the gas supply to the receiving chamber 2, the gas pressure being communicated to the pressure gauge through the by-pass $4^a$ from the gas main 11. This gas main 11 is preferably arranged, as shown, in the form of a tube 12, which extends diametrically across the receiving chamber 1. As shown in Figures 1 and 2, a valve 13 is connected by means of a curved arm $13^a$ with a diaphragm 5. This valve 13 controls the gas inlet to the receiving chamber from the gas main, and admits gas so long as the pressure in the receiving chamber does not rise above such a predetermined point as to lift the diaphragm 5 and consequently close the outlet $11^a$ through the said valve 13. The weighted arm 14 presses down the diaphragm 6 through the member 15. The desired pressure on the upper diaphragm 6 is adjusted through the position of the weight on the lever arm 14, which controls the pressure on the diaphragm 6. Adjusting mechanism, such as the right and left hand screws $5^1$ and $5^2$, can be employed to compensate for change of volume of the non-elastic fluid 10, caused through variation in temperature or leakage, by retaining the normal position of the pointer in the centre of the scale. The thermometer 16 indicates the temperature of the gas as it passes from the receiving chamber 1 through the valve 3 to the passage $12^b$ leading to the delivery chamber 2. The valve 3 is independent of but can be adjusted through the spindle $17^b$ on the other side of a diaphragm 9 by the milled head $17^c$. The pointer 17 carried on the underside of the milled head $17^c$ is adapted to pass over the calibrated scale 18, which scale indicates the quantity of gas passing through the valve 3. The calibrations on this scale 18 correspond with the marks on the thermometer 16, as at A, B, C, D. The valve 3 is retained against the spindle $17^b$ by the gas pressure on the diaphragm 9.

The gas enters the apparatus through the inlet 11 by means of the bore 12 to the valve 13, and from thence to the receiving chamber 1, till its pressure exceeds the pressure upon the diaphragm 5 through the non-compressible liquid 10 and the diaphragm 6 through the weighted arm 14. The gas passes from the receiving chamber 1 across the bulb $16^a$ of the thermometer 16. Owing to the pressure of the gas on the diaphragm 9, the valve 3, which is attached to the diaphragm, remains as far open as the position of the pointer 17 on the graduated scale 18 will permit. The arrangement on the receiving side of the instrument is such, therefore, that if the gas admitted to the receiving chamber rises above a certain predetermined pressure, the diaphragms 5 and 6 are raised and consequently the valve 13 shuts off the admission of gas through the inlet $11^a$. On the other hand, when the gas falls below a predetermined pressure, these diaphragms fall and more gas is admitted. A washer $17^a$ is placed between 17 and 18 of such thickness that it is impossible to lift 3 through the spindle $17^b$ on the other side of the diaphragm 9 to such a position as to close the valve passage. The valve 3 is not intended for a stop valve, but to regulate the flow of gas down to the minimum amount likely to be required. From the valve 3 the gas passes on to the delivery chamber 2 and raises the diaphragm 7 as soon as sufficient pressure is reached. As the diaphragm 8 is connected with the diaphragm 7, it operates in opposition to 7, and this pressure will be less than that required to raise the diaphragm 5 by an amount determined by the relative sizes of the diaphragms 7 and 8. As soon as sufficient pressure is reached to raise diaphragm 7, the gas passes through 19, into 20, and thence to its destination. The non-return float valve 20 may be employed to prevent water from entering the apparatus in the event of excessive water pressure when used for chlorinating water.

Another form of the mechanism is shown in Figures 4 to 12 of the accompanying drawings. This form has the advantage that the principal chambers and conduits are formed of openings in a solid block of material, whereby many opportunities of leaking joints are obviated.

In these drawings, 1 indicates the gas-receiving chamber and 2 indicates the gas-delivery chamber. The gas pressure in these chambers is controlled by the pairs of flexible diaphragms 5, 6, and 7, 8, which pairs of diaphragms respectively control the valve opening the inlet to the receiving chamber 1 and the outlet from the delivery chamber 2. A non-elastic fluid 10, such as oil, fills the spaces between the said pairs of flexible diaphragms, these spaces being connected by the passage 23 (Figure 6). For convenience in manufacture this passage is drilled through from the end of the block (as shown in Figure 6) and plugged at the outer end. The space between the diaphragms 5, 6, is connected through the passages 10, 10$^b$ with a pressure gauge 4. The space 1$^a$ above the diaphragm 6 and the space 2$^a$ above the diaphragm 8 are respectively open to the atmosphere through the air relief outlets. 3 indicates the valve which controls the flow of gas between the gas-receiving chamber 1 and the gas-delivery chamber 2. 4 indicates the said pressure gauge, which shows the pressure of the gas supply to the receiving chamber 2, the gas pressure being communicated to the pressure gauge through the by-pass 4$^a$ from the gas main 11. This gas main 11 is preferably arranged, as shown, in the form of a tube 12, which extends diametrically across the receiving chamber 1. A valve 13 is connected by the supporting member 13$^a$ with the diaphragm 5. This valve 13 controls the gas inlet to the receiving chamber from the gas main, and admits gas so long as the pressure in the receiving chamber does not rise above such a predetermined point as to lift the diaphragm 5 and consequently close the outlet 11$^a$ through the said valve 13. The spring 21 presses down the diaphragm 6. The pressure of the spring upon the diaphragm 6 is adjusted by means of the head 22$^a$ through the screw 22 bearing upon said spring 21 which spring is pressed down upon the disc 26 which is connected through the spindle 27 with the said diaphragm 6. The thermometer 16 (Figures 4 and 9) indicates the temperature or the gas as it passes from the receiving chamber 1 through the valve 3 to the passage 12$^b$ leading to the delivery chamber 2. The valve 3 is independent of but can be adjusted through the spindle 17$^b$ on the other side of a diaphragm 9 by the milled head 17$^c$ (Figure 5). The pointer 17 carried on the underside of the milled head 17$^c$ is adapted to pass over the calibrated scale 18 (Figures 4 and 5) which scale indicates the quantity of gas passing through the valve 3. The calibrations on this scale 18 correspond with the marks on the thermometer 16, as at A. B. C. D. The valve 3 is retained against the spindle 17$^b$ by the gas pressure on the diaphragm 9.

The gas enters the apparatus through the inlet 11 by means of the bore 12 to the valve 13, and from thence to the receiving chamber 1, till its pressure exceeds the pressure upon the diaphragm 5 through the non-compressible liquid 10 and the diaphragm 6 from the spring 21. The gas passes from the receiving chamber 1 across the bulb 16$^a$ of the thermometer 16. Owing to the pressure of the gas on the diaphragm 9, the valve 3, which is attached to the diaphragm, remains as far open as the position of the pointer 17 on the graduated scale 18 will permit. The arrangement on the receiving side of the instrument is such, therefore, that if the gas admitted to the receiving chamber rises above a certain predetermined pressure, the diaphragms 5 and 6 are raised and consequently the valve 13 shuts off the admission of gas through the inlet 11$^a$. On the other hand, when the gas falls below a predetermined pressure, these diaphragms fall and more gas is admitted. The valve 3 is not intended for a stop valve, but to regulate the flow of gas down to the minimum amount likely to be required. From the valve 3 the gas passes on to the delivery chamber 2 and raises the diaphragm 7 as soon as sufficient pressure is reached. As the diaphragm 8 is connected with the diaphragm 7, it operates in opposition to 7, and this pressure will be less than that required to raise the diaphragm 5 by an amount determined by the relative sizes of the diaphragms 7 and 8. As soon as sufficient pressure is reached to raise diaphragm 7 the gas lifts the valve 19 and passes to the outlet passage. The non-return float valve 20 may be employed to prevent water from entering the apparatus in the event of excessive water pressure when used for chlorinating water.

Another form of the mechanism is shown in Figures 4 to 12 of the accompanying drawings. This form has the advantage that the principal chambers and conduits are formed of openings in a solid block of material, whereby many opportunities of leaking joints are obviated.

Finally it should be understood that the drawings illustrate correctly the functions of the non-elastic fluid which forms the essence of this invention, but such details as the forms of diaphragm, valve seatings, fluid-tight washers and so forth are not intended to be more than diagrammatic.

It will also be understood that all the figures only represent specific forms of the mechanism and that others may be employed, possibly differing as widely in general appearance from these examples as these two examples do from one another.

Claims.

1. Valve mechanism for regulating the flow of compressed gases, comprising a casing, two pairs of diaphragms within said casing, a continuous system of non-elastic fluid between said diaphragms, means for providing pressure on the upper diaphragm of the first pair of diaphragms, a valve controlled by the under diaphragm of the first pair of diaphragms for admitting gas to said under diaphragm, and a valve controlled by the second pair of diaphragms for opening the outlet from the gas chamber beneath the under diaphragm of said second pair of diaphragms.

2. Valve mechanism for regulating the flow of compressed gases, comprising a casing, two pairs of diaphragms within said casing, a continuous system of non-elastic fluid between said diaphragms, means for providing pressure on the upper diaphragm of the first pair of diaphragms, a valve controlled by the under diaphragm of the first pair of diaphragms for admitting gas to said under diaphragm, a valve for controlling the flow of gas from the chamber beneath the under diaphragm of the first pair of diaphragms to the chamber beneath the under diaphragm of the second pair of diaphragms, means for regulating said valve, and a valve controlled by the second pair of diaphragms for opening the outlet from the gas chamber beneath the under diaphragm of said second pair of diaphragms.

3. Valve mechanism for regulating the flow of compressed gases, comprising a casing, a gas-receiving chamber within said casing, a gas-delivery chamber within said casing, two pairs of diaphragms respectively arranged in said chambers, a continuous system of non-elastic fluid between said diaphragms, means for providing pressure on the upper diaphragm of the first pair of diaphragms, a valve controlled by the under diaphragm of the first pair of diaphragms for admitting gas to said receiving chamber, a valve for controlling the flow of gas from said receiving chamber to said gas-delivery chamber, means for regulating said valve, and a valve controlled by the second pair of diaphragms for opening the outlet from said gas-delivery chamber.

4. Valve mechanism for regulating the flow of compressed gases, comprising a casing, two pairs of diaphragms within said casing, a continuous system of non-elastic fluid between said diaphragms, means for providing pressure on the upper diaphragm of the first pair of diaphragms, means for regulating said pressure, a valve controlled by the under diaphragm of the first pair of diaphragms for admitting gas to a receiving chamber beneath said under diaphragm, a valve for controlling the flow of gas from said receiving chamber to a delivery chamber beneath the under diaphragm of the second pair of diaphragms, means for regulating said valve, and a valve controlled by the second pair of diaphragms for opening the outlet from the gas-delivery chamber beneath the under diaphragm of said second pair of diaphragms.

5. Valve mechanism for regulating the flow of compressed gases, comprising a casing bored out from a solid block of material, two pairs of diaphragms within said casing, a continuous system of non-elastic fluid between said diaphragms, a disc mounted on the upper diaphragm of the first pair of diaphragms, spring means pressing upon said disc, means for regulating the pressure of said spring, a valve controlled by the under diaphragm of the first pair of diaphragms for admitting gas to said under diaphragm, and a valve controlled by the second pair of diaphragms for opening the outlet from the gas chamber beneath the under diaphragm of said second pair of diaphragms.

6. Valve mechanism for regulating the flow of compressed gases, comprising a casing bored out from a solid block of material, a gas-receiving chamber within said casing, a gas-delivery chamber within said casing, two pairs of diaphragms respectively arranged in said chambers, a continuous system of non-elastic fluid between said diaphragms, a disc mounted on the upper diaphragm of the first pair of diaphragms, spring means pressing upon said disc, means for regulating the pressure of said spring, a valve controlled by the under diaphragm of the first pair of diaphragms for admitting gas to said receiving chamber, a valve for controlling the flow of gas from said gas-receiving chamber to said gas-delivery chamber, means for regulating said valve, and a valve controlled by the second pair of diaphragms for opening the outlet from said gas-delivery chamber.

In testimony whereof I sign my name to this specification.

A. E. BAWTREE.